United States Patent

Monney et al.

(10) Patent No.: US 7,815,381 B2
(45) Date of Patent: Oct. 19, 2010

(54) COMPUTER KEYBOARD

(75) Inventors: Patrick Monney, Mex (CH); Alain Tabasso, Essertines (CH); Antoine Merminod, Gimel (CH); Keith Tritschler, Greystones (IE)

(73) Assignee: Logitech Europe S.A. (CH)

( * ) Notice: Subject to any disclaimer, the term of this patent is extended or adjusted under 35 U.S.C. 154(b) by 943 days.

(21) Appl. No.: 11/497,800

(22) Filed: Aug. 1, 2006

(65) Prior Publication Data

US 2009/0047053 A1    Feb. 19, 2009

Related U.S. Application Data

(62) Division of application No. 10/766,690, filed on Jan. 27, 2004, now abandoned, which is a division of application No. 09/813,921, filed on Mar. 20, 2001, now Pat. No. 6,682,235.

(51) Int. Cl.
*B41J 5/00* (2006.01)
(52) U.S. Cl. .......................... 400/472; 400/479
(58) Field of Classification Search ................. 400/472, 400/479
See application file for complete search history.

(56) References Cited

U.S. PATENT DOCUMENTS

| | | | |
|---|---|---|---|
| 3,765,378 A | 10/1973 | Waldrum | |
| 3,902,398 A | 9/1975 | Nakada et al. | |
| 4,232,390 A | 11/1980 | McEvilly, Jr. | |
| 4,483,634 A | 11/1984 | Frey et al. | |
| 4,610,415 A | 9/1986 | Miller | |
| 4,633,522 A | 12/1986 | Yamamoto et al. | |
| 4,658,124 A | 4/1987 | Bertina | |
| 4,773,783 A * | 9/1988 | Dickie | 400/682 |
| 4,804,279 A | 2/1989 | Berkelmans et al. | |
| 4,932,304 A | 6/1990 | Franzmann | |
| 5,017,030 A | 5/1991 | Crews | |
| 5,073,050 A | 12/1991 | Andrews | |
| 5,119,078 A | 6/1992 | Grant | |

(Continued)

OTHER PUBLICATIONS

Non-Final Office Action for U.S. Appl. No. 10/766,690 mailed on Jun. 23, 2005; 6 pages.

(Continued)

*Primary Examiner*—Anthonthy H. Nguyen
(74) *Attorney, Agent, or Firm*—Townsend and Townsend and Crew LLP

(57) ABSTRACT

Embodiments of the present invention are directed to a computer keyboard having user-manipulable components for multi-media applications and additional computer interface and control purposes that are desirably designed for ease of manufacturing and cost effectiveness. A preformed roller module has a small top cover and base forming an enclosure to hold the entire roller mechanism, including the electronic components. The roller module is then attached to the keyboard. A volume control dial is provided for audio volume control. The dial desirably is also preformed and then attached to the keyboard. Keyboard feet may be provided on the rear edge of the keyboard for tilting the keyboard without taking up space at the bottom of the keyboard, so that the keyboard height profile can be kept low. An opaque keyboard frame may be placed over the key mechanisms of the keys to hide them from sight, and a translucent top case may be placed over the opaque keyboard frame. The keys protrude through openings of the opaque keyboard frame and the translucent top case.

4 Claims, 5 Drawing Sheets

U.S. PATENT DOCUMENTS

| | | | |
|---|---|---|---|
| 5,129,747 A | 7/1992 | Hutchison | |
| 5,145,270 A | 9/1992 | Darden | |
| 5,163,161 A | 11/1992 | Bowles et al. | |
| 5,196,640 A | 3/1993 | Asahi et al. | |
| 5,358,230 A | 10/1994 | Ikemori et al. | |
| 5,360,280 A | 11/1994 | Camacho et al. | |
| 5,553,953 A | 9/1996 | Herman et al. | |
| 5,826,992 A | 10/1998 | Camacho et al. | |
| 5,918,957 A * | 7/1999 | Bovio et al. | 312/223.2 |
| 5,929,774 A | 7/1999 | Charlton | |
| 6,042,282 A | 3/2000 | Camacho et al. | |
| 6,289,466 B1 | 9/2001 | Bayramoglu et al. | |
| 6,304,830 B1 | 10/2001 | Lee | |
| 6,443,643 B1 | 9/2002 | Camacho et al. | |
| 6,467,979 B2 | 10/2002 | Camacho et al. | |
| 6,703,962 B1 | 3/2004 | Marics et al. | |
| 6,840,690 B2 | 1/2005 | Camacho et al. | |
| 2004/0252109 A1 | 12/2004 | Trent, Jr. et al. | |
| 2005/0052832 A1 | 3/2005 | Monney | |
| 2005/0071626 A1 | 3/2005 | Bear et al. | |

OTHER PUBLICATIONS

Final Office Action for U.S. Appl. No. 10/766,690 mailed on Nov. 28, 2005; 6 pages.

Final Office Action for U.S. Appl. No. 10/766,690 mailed on Mar. 1, 2006; 8 pages.

* cited by examiner

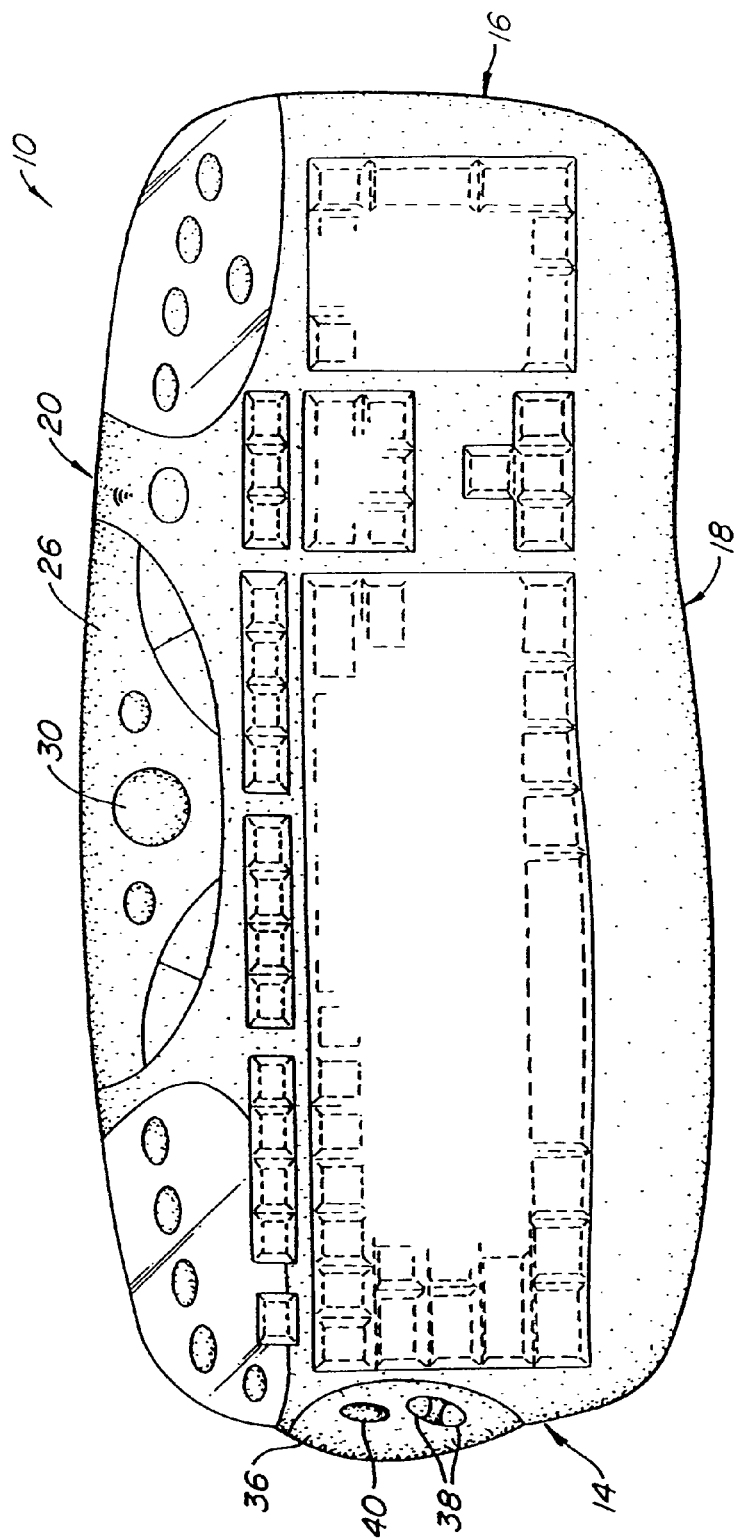
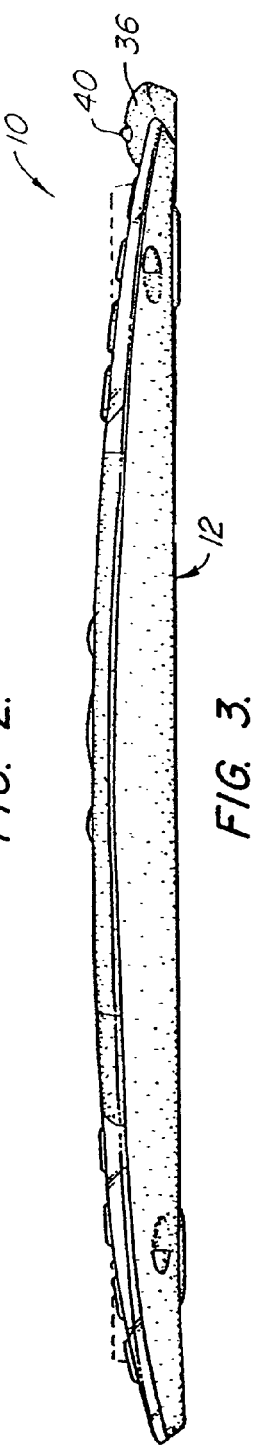
FIG. 2.
FIG. 3.

US 7,815,381 B2

COMPUTER KEYBOARD

BACKGROUND OF THE INVENTION

The present invention relates to computer keyboards (corded or wireless) and, more particularly, to a computer keyboard having user-manipulable components for multi-media applications and additional computer interface and control purposes. In keyboard manufacturing, it is difficult to control tolerances on a large molded piece for the top or bottom case of the keyboard. This problem is exacerbated when buttons other than standard keyboard buttons and other components or devices are added to the keyboard.

SUMMARY OF THE INVENTION

Embodiments of the present invention are directed to a computer keyboard having user-manipulable components for multi-media applications and additional computer interface and control purposes. These components are desirably designed for ease of manufacturing and cost effectiveness. A preformed roller module has a small top cover and base forming an enclosure to hold the entire roller mechanism, including the electronic components. The roller module is then attached to the keyboard. The use of the preformed roller module eliminates the need to control tolerances on a large molded piece of the top case of the keyboard to accommodate the roller components. A volume control dial is provided for audio volume control. The dial desirably is also preformed and then attached to the keyboard. Keyboard feet may be provided on the rear edge of the keyboard for tilting the keyboard without taking up space at the bottom of the keyboard, so that the keyboard height profile can be kept low.

In accordance with an aspect of the present invention, a keyboard comprises at least one keyboard foot coupled to an edge of the keyboard. The keyboard foot is movable between an inclined position with the keyboard foot extending downward from the edge below a bottom of the keyboard, and a neutral position with the keyboard foot disposed adjacent the edge above the bottom of the keyboard. In some embodiments, the keyboard foot is rotatably coupled to the edge of the keyboard by a hinge to rotate between the inclined position and the neutral position. The edge may be a rear edge of the keyboard.

In accordance with another aspect of the invention, a keyboard comprises a keyboard module having a keyboard body. A preformed roller module is fixedly attached to the keyboard body, and includes a preformed roller module housing having a slot and a user-manipulable roller partially exposed through the slot. The preformed roller module housing includes a rotational support to support the roller in rotation relative to the preformed roller module housing around a rotational axis of the roller. The roller module is operatively coupled with the keyboard module to interface with the keyboard module.

In some embodiments, the preformed roller module housing includes a translational support to support the roller for movement in translation relative to the preformed roller module housing in a direction perpendicular to the rotational axis of the roller. A spring is coupled between the translational support and the preformed roller module housing.

In specific embodiments, the preformed roller module includes a switch which is activated by moving the roller in translation to contact the switch. The spring is a coiled spring which biases the roller away from the switch. The roller is disposed on a first side of the switch and the coiled spring extends from the first side of the switch to a second side of the switch opposite from the first side. The coiled spring includes a spring support extension disposed on the second side of the switch. The spring support extension supports the coiled spring on the second side to facilitate smooth translational movement of the roller relative to the switch. The spring support extension is supported on the roller module housing.

In accordance with another aspect of the present invention, a keyboard for a computer comprises a user-manipulable volume control dial disposed on a keyboard surface of the keyboard for controlling an audio volume of the computer. The volume control dial includes a cylinder having an undulating surface and an axis generally perpendicular to the keyboard surface. A spring is biased against the undulating surface of the cylinder to produce a ratcheting movement of the cylinder during rotation of the cylinder to provide tactile user feedback. In specific embodiments, the spring is biased against a smooth surface of the cylinder to produce a frictional feedback to the user (i.e., no ratcheting).

In some embodiments, the spring includes a cylindrical portion in contact with the undulating surface of the cylinder. The volume control dial is movable toward and away from the keyboard surface, and the spring biases the volume control dial away from the keyboard surface. The volume control dial may be preformed and attached as a preformed module to the keyboard. The cylinder includes a plurality of slits. A photoemitter is mounted on a first side of the cylinder to direct light through the slits in the cylinder. A photodetector is mounted on a second side of the cylinder, opposite from the photoemitter, to detect light from the photoemitter passing through the slits in the cylinder. The positions of the photodetector and photoemitter can be switched.

In accordance with another aspect of the invention, a keyboard comprises a plurality of keys having key mechanisms connected thereto. An opaque keyboard frame is placed over the key mechanisms to cover at least a substantial portion of the key mechanisms. The plurality of keys protrude through openings of the opaque keyboard frame. A translucent top case is placed over the opaque keyboard frame. The plurality of keys protrude through openings of the translucent top case.

In some embodiments, the opaque keyboard frame has a generally smooth upper surface visible through the translucent top case. At least one module, such as a roller module or a multi-media module, may protrude through openings of the translucent top case.

BRIEF DESCRIPTION OF THE DRAWINGS

FIG. 2 is a top plan view of the keyboard of FIG. 1;

FIG. 3 is a rear elevational view of the keyboard of FIG. 1;

DESCRIPTION OF THE SPECIFIC EMBODIMENTS

Figure 4:
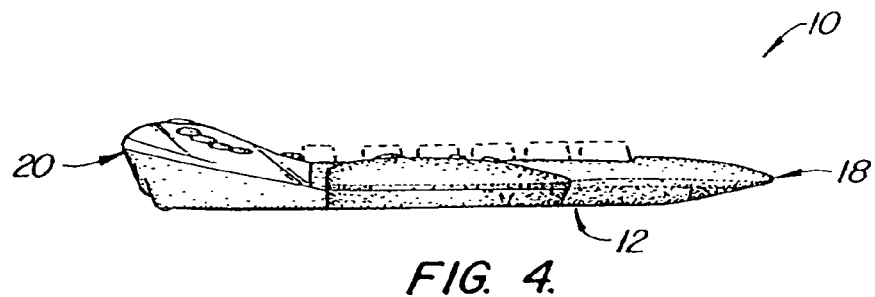
FIG. 4 is a left side elevational view of the keyboard of FIG. 1.
Figure 5:
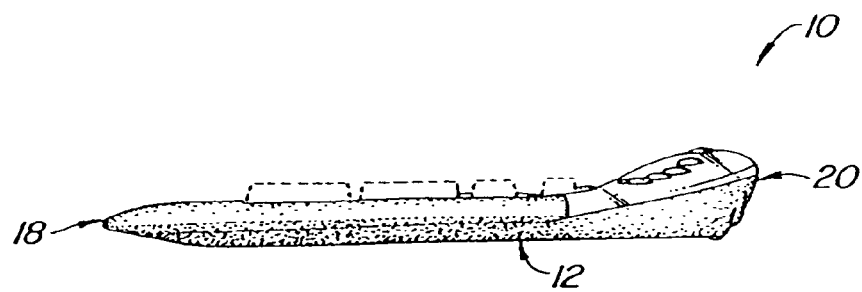
FIG. 5 is a right side elevational view of the keyboard of FIG. 1.

FIGS. 1-5 illustrate a computer keyboard 10 including a body or housing which desirably has a low profile. For example, the height of the body measured from the bottom 12 is equal to or less than about 21-23 mm over a large portion of the keyboard, and increases to a maximum of about 34 mm toward the rear of the keyboard in one specific embodiment, as best seen in FIGS. 4 and 5. The keyboard body has a length (from the left side 14 to the right side 16) of about 490 mm and a width (from the front side 18 to the rear side 20) of about 220 mm. Of course, the keyboard 10 may have other dimensions.

Figure 1:
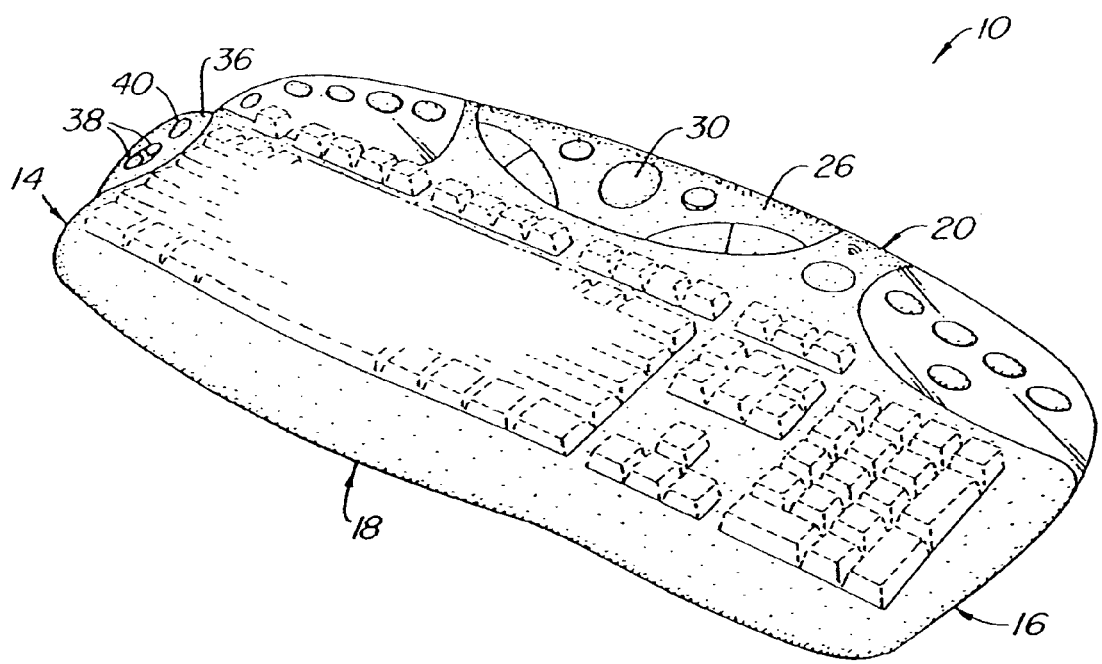
FIG. 1 is a perspective view of the keyboard according to an embodiment of the present invention.

As best seen in FIGS. 1 and 2, the keyboard 10 includes a multi-media module 26 having a plurality of control members such as buttons and knobs. One of the control members is a volume control dial 30 for controlling an audio volume of the computer. The keyboard 10 further includes a roller module 36 which includes buttons 38 for activating button switches underneath and a roller 40 protruding through a slot provided on the top cover of the roller module 36. The roller module 36 is desirably preformed prior to being assembled with the remainder of the keyboard 10. The keyboard 10 includes a recessed region for receiving the preformed roller module 36. These features of the keyboard will be described in more detail below.

Figure 6A:
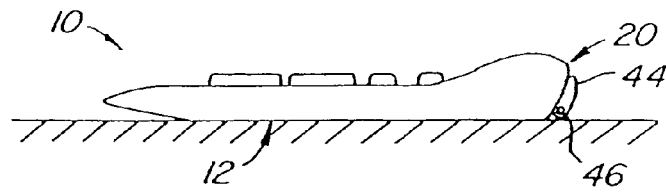
FIGS. 6a and 6b are right side elevational views of the keyboard of FIG. 1 schematically illustrating the keyboard feet.
Figure 6B:
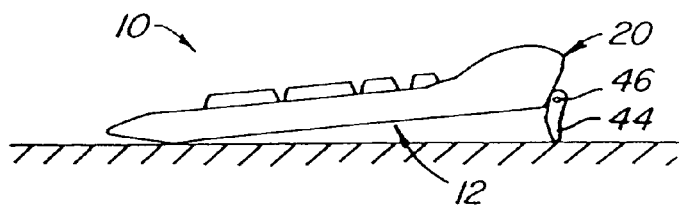

FIGS. 6a and 6b illustrate tilting of the keyboard 10 using one or more keyboard feet 44. Conventional keyboard feet are disposed at the bottom of the keyboard, and tend to increase the height profile of the keyboard. For a low profile keyboard, relocating the keyboard feet 44 to the side of the keyboard can maintain the low profile. The keyboard feet 44 are movable between a neutral or folded position (FIG. 6a) and an inclined position (FIG. 6b). In the specific embodiment shown, the feet 44 are each rotatably attached to the side of the keyboard 10 by a hinge 46. In the neutral position, the feet 44 are folded onto the side of the keyboard above the bottom 12 with a zero degree tilt. In the inclined position, the feet 44 extend downward from the side of the keyboard below the bottom 12 to produce tilting of the keyboard. Typically a pair of keyboard feet 44 are disposed along the rear side 20. In an alternative embodiment, for example, a pair of keyboard feet may be disposed on opposite sides along the left edge 14 and the right edge 16 near the rear of the keyboard 10 (FIGS. 1-5).

Figure 7:
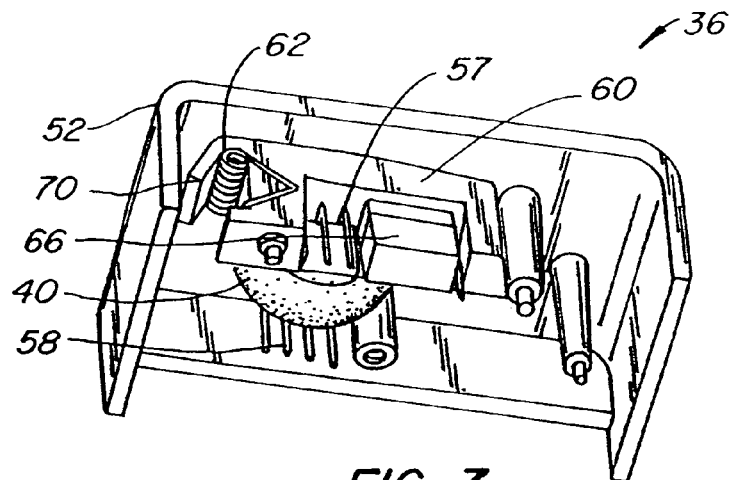
FIG. 7 is a lower perspective view of a roller module according to an embodiment of the present invention.
Figure 8:
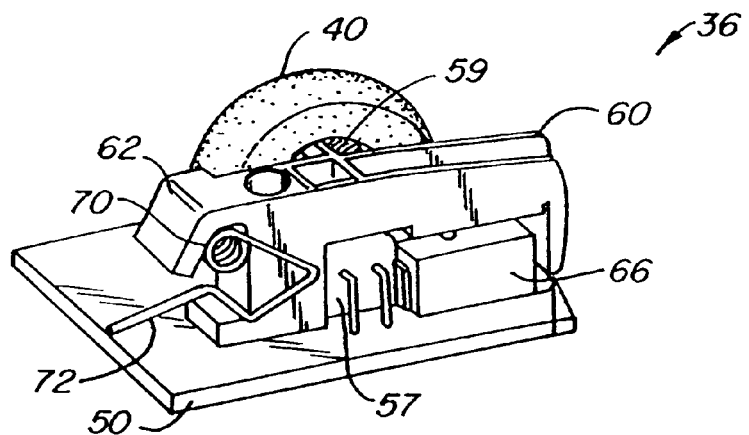
FIG. 8 is an upper perspective view of the roller module of FIG. 7.

The preformed roller module 36 is illustrated in FIGS. 7 and 8. The roller module 36 has a base 50 and a top cover 52 forming a roller enclosure or housing. When assembled, the roller enclosure is fixedly attached to the keyboard body. A roller 40 protrudes through a slot of the top cover 52 to allow manipulation by a user. The roller 40 is mounted on a movable translational support 60, for instance, by a shaft extending from the support 60 through the center axis of the roller 40. The roller 40 includes slits which permit light to pass therethrough. A photoemitter 57 and a photodetector 58 are disposed on opposite sides of the roller 40. The photodetector 58 detects light emitted by the photoemitter 57 and passing through the slits of the roller 40, and determines the amount of rotation from the number of times the photodetector 58 is illuminated. The undulating surface 59 of the roller 40 can be used to produce a ratcheting effect during rotation of the roller 40 to provide user tactile feedback.

The support 60 guides the movement of the roller 40 up and down relative to the roller module housing. This allows a user to press down on the roller 40 and the support 60 to contact and activate a switch 66. A spring 70 is mounted to the support 60 to bias the support 60 upward and return the support 60 and the roller 40 to the upper position away from the switch 66 when the user removes the downward force on the roller 40. FIGS. 7 and 8 show a coiled spring 70 mounted at one end 62 of the support 60. Guide columns may be provided in the roller module housing to guide the support 60 or roller 40 during movement relative to the switch 66. In another embodiment, a spring coupled to the guide column can be used to bias the support 60 upward instead of the spring 70.

In the embodiment shown, the roller 40 moves in translation to provide "clicking." In another embodiment with no "clicking," the support for the roller 40 is fixed in position so that the roller 40 rotates but does not move in translation.

The roller module 36 is operatively coupled with the keyboard 10 to interface with the keyboard 10 and the computer. For instance, the rotation of the roller 40 and translation of the roller 40 to activate the switch 66 may be used to manipulate a cursor on the computer screen. In one example, the rotation of the roller 40 may be used for scrolling a document on the computer screen, and the translation of the roller 40 may be used to pop up a roller configuration menu on the screen.

The use of a preformed roller module 36 is advantageous for ease of manufacturing and cost savings. It is difficult to control tolerances on a large molded piece for the top case of the keyboard 10. The use of the preformed roller module 36 eliminates the need to do so for the roller 36 and pushbuttons 38. The preformed roller module 36 has a small top cover 52 and base 50 forming an enclosure to hold the entire roller mechanism, including the electronic components. This results in a more effective design for incorporating the roller feature into the keyboard. The module 36 can be more precisely manufactured in a cost-effective manner. The module 36 makes the roller feature more visible and intuitive to the user, and can be separately manufactured, assembled, and tested.

As shown in FIGS. 7 and 8, the switch 66 is disposed below the support 60, and the roller 40 is disposed on one side of the switch 66. The spring 70 extends from the side of the switch 66 where the roller 40 is disposed to the opposite side of the switch 66. As the roller 40 is pressed down, it may tend to tilt the translation mechanism to one side of the switch 66, and cause friction as well as wear and tear. To overcome this problem, the spring 70 desirably includes a spring support extension 72 disposed opposite from the roller 40 and supported on the base 50 to provide balanced and smooth translational movement of the roller 40 as the support 60 moves up and down.

Figure 9:
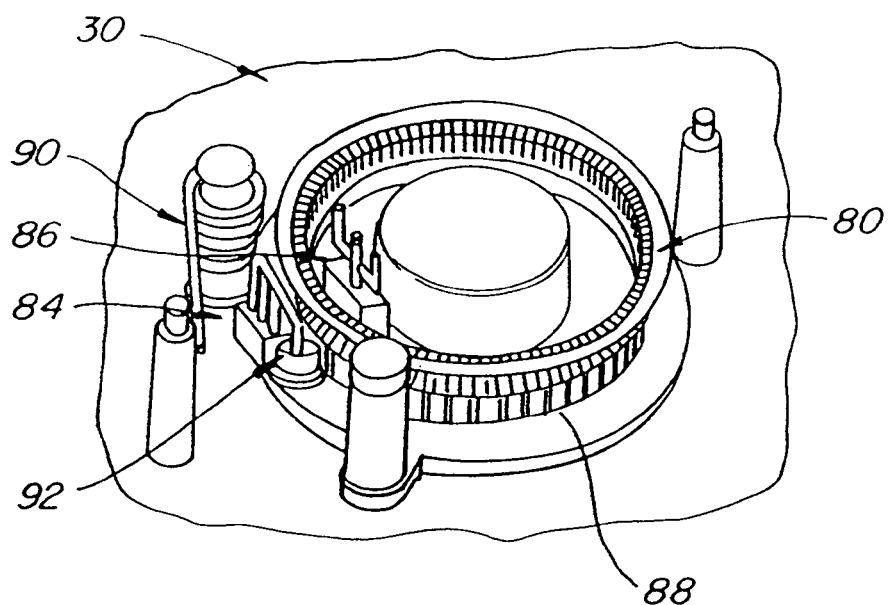
FIG. 9 is a perspective view of a volume control dial mechanism according to an embodiment of the present invention.
Figure 10:
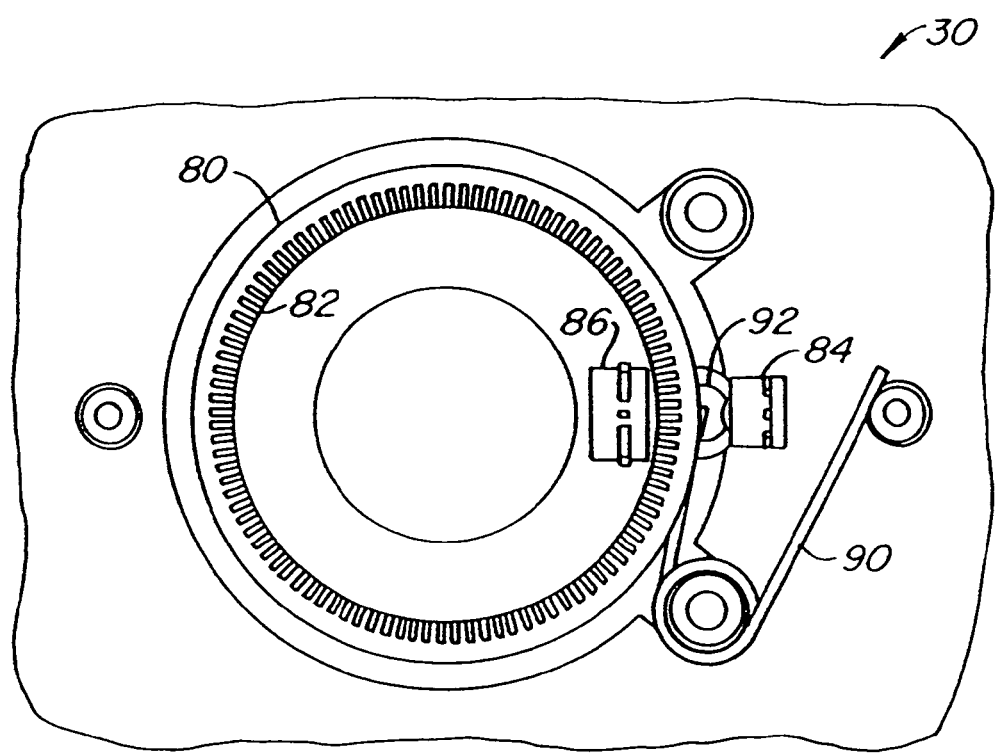
FIG. 10 is a top plan view of the volume control dial mechanism of FIG. 9.

FIGS. 9 and 10 illustrate the internal mechanism of the volume control dial 30. The dial 30 includes a cylinder 80 having an axis which may be generally perpendicular to the surface of the keyboard 10, although other orientations are possible. The cylinder 80 includes a plurality of slits 82 which permit light to pass therethrough. A photoemitter 84 and a photodetector 86 are disposed on opposite sides of the cylinder 80. The photodetector 86 detects light emitted by the photoemitter 84 and passing through the slits 82 of the cylinder 80, and determines the amount of rotation from the number of times the photodetector 86 is illuminated.

The cylinder 80 includes an undulating surface 88. A spring 90 contacts the undulating surface 88 to produce a ratcheting effect during rotation of the cylinder 80 to provide user tactile feedback. For smooth operation and feel, a small cylinder 92 is attached to the spring 90 to contact the undulating surface 88. In another embodiment, the spring is biased against a smooth surface of the cylinder to produce a frictional feedback to the user (i.e., no ratcheting).

The volume control dial 30 may be movable toward and away from the keyboard surface, so that the user may press down on the dial 30 to turn it on and off, for example. The spring 90 may be coupled to the cylinder 80 in a manner to bias the dial 30 away from the keyboard surface and return it to an upper position upon removal of the force applied by the user.

The volume control dial 30 may be preformed prior to being assembled with the remainder of the keyboard 10. As in the case of the roller module 36, the use of a preformed dial 30 eliminates the need to control tolerances on a large molded piece for the top case of the keyboard 10. Thus, the module 36 can be more precisely manufactured in a cost-effective manner.

Figure 11:
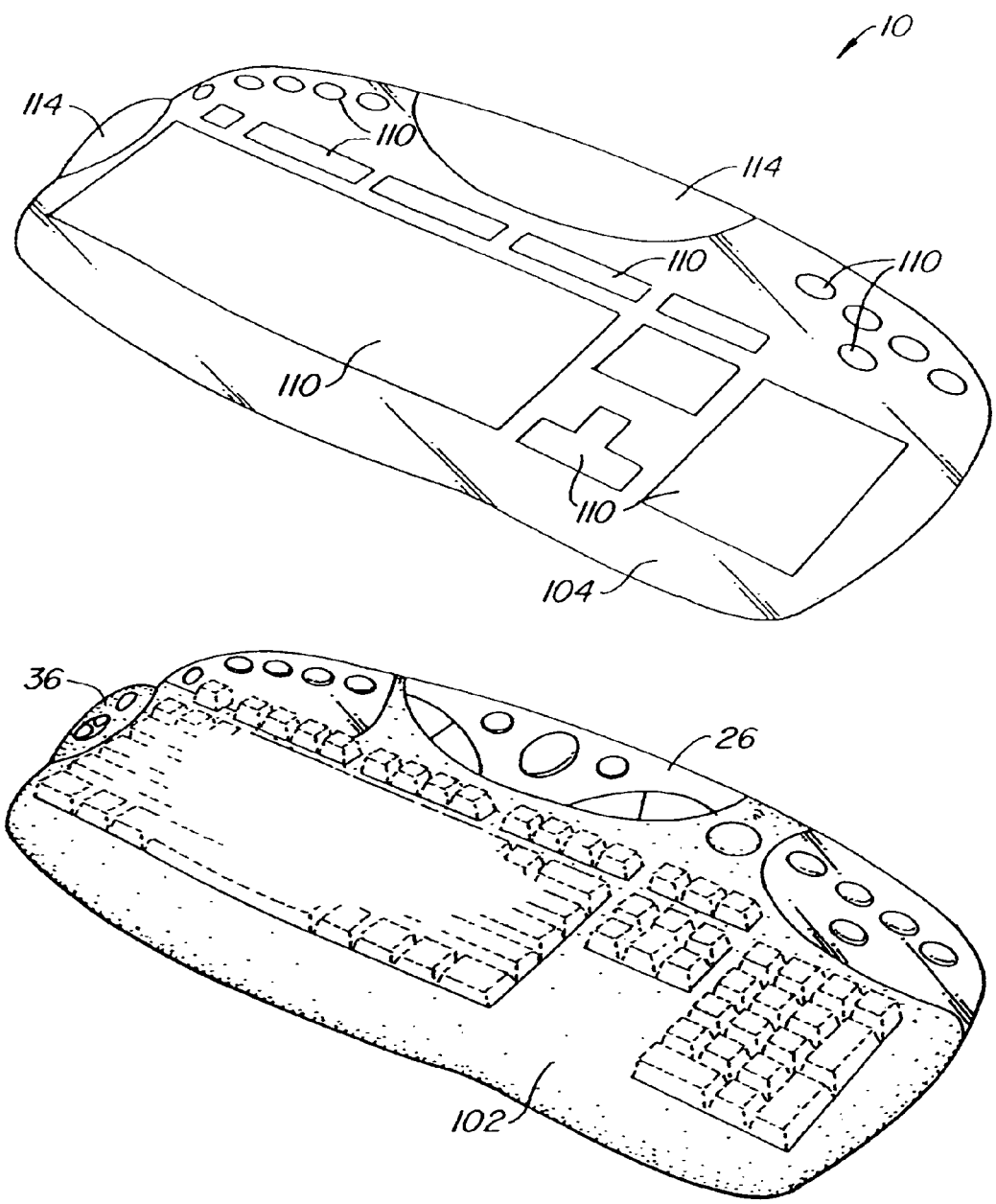
FIG. 11 is an exploded view of the keyboard of FIG. 1 showing a translucent top case according to another embodiment of the invention.

In FIG. 11, the keyboard 10 includes an opaque keyboard frame 102 and a translucent top case placed over the opaque keyboard frame 102. The keyboard frame 102 includes a plurality of openings through which the plurality of keys protrude. The keys have key mechanisms connected thereto. The opaque keyboard frame 102 is placed over the key mechanisms to cover and hide from sight at least a substantial portion of the key mechanisms, as well as electronics, cables, connectors, membranes, screws or other fasteners, and the like. The opaque keyboard frame 102 is extended as much as possible across the keyboard to cover and hide underlying key mechanisms. The upper surface of the keyboard frame 102 is visible through the top case 104, and desirably is generally smooth and free of ribs, screw bosses, gates, ejectors, and the like. The upper surface of the frame 102 may be surface treated by, for example, texturing, ribbing, polishing, or the like.

The top case 104 includes a plurality of key openings 110 through which the plurality of keys protrude. Module openings 114 are provided to accommodate the protruding multimedia module 26 and the roller module 36. The top case 104 may be surface treated, for example, to produce a high gloss surface.

The above-described arrangements of apparatus and methods are merely illustrative of applications of the principles of this invention and many other embodiments and modifications may be made without departing from the spirit and scope of the invention as defined in the claims. For example, the shapes, sizes, and locations of the various components of the keyboard may be changed. The roller 40 may have a different position or a different orientation (e.g., horizontally disposed instead of vertically disposed), and there may be a plurality of rollers. As mentioned above, the volume control dial 30 may product ratcheting or no ratcheting during rotation. The scope of the invention should, therefore, be determined not with reference to the above description, but instead should be determined with reference to the appended claims along with their full scope of equivalents.

What is claimed is:

1. A keyboard comprising:
   at least one keyboard foot coupled to a backside of the keyboard and being movable between an inclined position with the keyboard foot extending downward from the backside with a portion of the keyboard foot below a bottom of the keyboard and another portion of the keyboard foot above a bottom of the keyboard and a neutral position with a whole of the keyboard foot disposed adjacent to the backside above the bottom of the keyboard.

2. The keyboard of claim 1, further comprising a hinge configured to rotatably couple the keyboard foot to the backside so that the keyboard foot is rotatable between the inclined position and the neutral position.

3. The keyboard of claim 1 wherein the keyboard foot wholly folds onto the backside of the keyboard in the neutral position.

4. The keyboard of claim 1 comprising a plurality of keyboard feet.

\* \* \* \* \*